(12) United States Patent
Hawboldt et al.

(10) Patent No.: US 8,939,471 B2
(45) Date of Patent: Jan. 27, 2015

(54) DRAIN LINE ADAPTER (71) Applicant: General Electric Company, Schenectady, NY (US)

(72) Inventors: Mary Kathryn Hawboldt, Louisville, KY (US); James Robert White, Crestwood, KY (US); Nand Kishore Ravanam, Westmont, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/674,995

(22) Filed: Nov. 13, 2012

(65) Prior Publication Data

US 2014/0130903 A1 May 15, 2014

(51) Int. Cl.
*F16L 43/00* (2006.01)
*F16L 51/00* (2006.01)

(52) U.S. Cl.
CPC ..................................... *F16L 51/00* (2013.01)
USPC .................................... 285/132.1; 210/172.1

(58) Field of Classification Search
USPC ....................... 285/131.1, 126.1, 132.1, 188; 210/172.1
See application file for complete search history.

(56) References Cited

U.S. PATENT DOCUMENTS

| 5,449,456 | A | 9/1995 | Bowman |
| 5,635,058 | A * | 6/1997 | Bowman ..................... 210/172.1 |
| 5,681,459 | A | 10/1997 | Bowman |
| 5,944,985 | A | 8/1999 | Bowman |
| 6,193,879 | B1 | 2/2001 | Bowman |
| 6,651,272 | B2 | 11/2003 | Bowman |
| 7,290,557 | B1 | 11/2007 | Bowman |
| 2010/0181244 | A1 * | 7/2010 | Stimpson ...................... 210/232 |

* cited by examiner

*Primary Examiner* — Aaron Dunwoody
(74) *Attorney, Agent, or Firm* — Dority & Manning, P.A.

(57) ABSTRACT

The present subject matter provides a drain line adapter. The drain line adapter includes at least two conduits. The two conduits can be oriented or positioned relative to one another in order to facilitate drainage of the drain line adapter. The two conduits can also be oriented or positioned relative to one another in order to hinder clogging of the drain line assembly.

16 Claims, 5 Drawing Sheets

DRAIN LINE ADAPTER

FIELD OF THE INVENTION

The present subject matter relates generally to drain line adapters.

BACKGROUND OF THE INVENTION

Drain line adapters are generally mounted below a kitchen sink in order to consolidate or merge various waste water streams. In particular, certain drain line adapters include two inlets and a single outlet. One inlet can be connected to a kitchen sink drain line and receive waste from the same. The other can be connected to a water filtration system such as a reverse osmosis filtration system. Both inlets can direct waste towards the single outlet.

In certain drain line adapters, the two inlets merge at about a right angle. In particular, one inlet is generally vertically oriented, and the other inlet is generally horizontally oriented. Waste from the kitchen sink drain line is generally directed into the vertically oriented inlet, and waste from the water filtration system is generally directed into the horizontally oriented inlet.

However, waste from the kitchen sink drain line can contain relatively large solids, such as food debris. Such large solids can settle within the horizontally oriented inlet and potentially cause clogging of the same. To hinder such clogging, certain drain line adapters include an internal baffle that hinders solids from collecting within the horizontally oriented inlet. However, internal baffles can be difficult or expensive to manufacture and can also obstruct waste flowing through the drain line adapter.

In addition, the water filtration system is generally connected to the drain line adapter with a removable coupling. Such couplings can work loose over time and potentially cause a leak. Thus, such couplings can be difficult to properly connect to the water filtration system.

Accordingly, a drain line adapter with features for hindering clogging of the drain line adapter would be useful. In particular, a drain line adapter with features for hindering clogging of the drain line adapter without using an internal baffle would be useful. In addition, a drain line adapter with features for securely connecting a water filtration system to the drain line adapter, e.g., without using a removable coupling, would be useful.

BRIEF DESCRIPTION OF THE INVENTION

The present subject matter provides a drain line adapter. The drain line adapter includes at least two conduits. The two conduits can be oriented or positioned relative to one another in order to facilitate drainage of the drain line adapter. The two conduits can also be oriented or positioned relative to one another in order to hinder clogging of the drain line assembly. Additional aspects and advantages of the invention will be set forth in part in the following description, or may be apparent from the description, or may be learned through practice of the invention.

In a first exemplary embodiment, a drain line adapter is provided. The drain line adapter defines a vertical direction. The drain line adapter includes a primary conduit that defines a drain passage, an inlet, and an outlet. The drain passage of the primary conduit extends longitudinally along the vertical direction such that the inlet of the primary conduit is disposed above the outlet of the primary conduit along the vertical direction. A slip joint connector is mounted at the inlet of the primary conduit. A branch conduit defines a branch passage and an opening. The branch conduit mounted to the primary conduit. The primary conduit and the branch conduit defining an angle $\phi$ therebetween. The angle $\phi$ is greater than ninety degrees. The branch passage of the branch conduit is in fluid communication with the drain passage of the primary conduit. A push connector is mounted at the opening of the branch conduit.

In a second exemplary embodiment, a drain line adapter is provided. The drain line adapter defines a vertical direction. The drain line adapter includes a drain conduit that defines a drain passage and an inlet. The drain passage of the drain conduit extends longitudinally along the vertical direction. A slip joint connector is mounted at the inlet of the primary conduit. A branch conduit defines a branch passage and an opening. The branch passage of the branch conduit extends longitudinally along the vertical direction. The branch conduit is positioned parallel to the drain conduit. A push connector is mounted at the opening of the branch conduit. An outlet conduit defines an outlet passage. The outlet passage of the outlet conduit extends longitudinally along the vertical direction. A manifold connects the drain conduit, the branch conduit, and the outlet conduit such that the drain passage of the drain conduit, the branch passage of the branch conduit, and the outlet passage of the outlet conduit are in fluid communication.

In a third exemplary embodiment, a drain line adapter is provided. The drain line adapter defines a vertical direction. The drain line adapter includes a drain conduit that defines a drain passage and an inlet. The drain passage of the drain conduit extends longitudinally along the vertical direction. A slip joint connector is mounted at the inlet of the primary conduit. An outlet conduit defines an outlet passage. The outlet passage of the outlet conduit extends longitudinally along the vertical direction. A branch conduit defines a branch passage and an opening. The branch conduit is mounted to the outlet conduit. The outlet conduit and the branch conduit defining an angle $\theta$ therebetween. The angle $\theta$ is greater than ninety degrees. A push connector is mounted at the opening of the branch conduit. A manifold connects the drain conduit, the branch conduit, and the outlet conduit such that the drain passage of the drain conduit, the branch passage of the branch conduit, and the outlet passage of the outlet conduit are in fluid communication.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
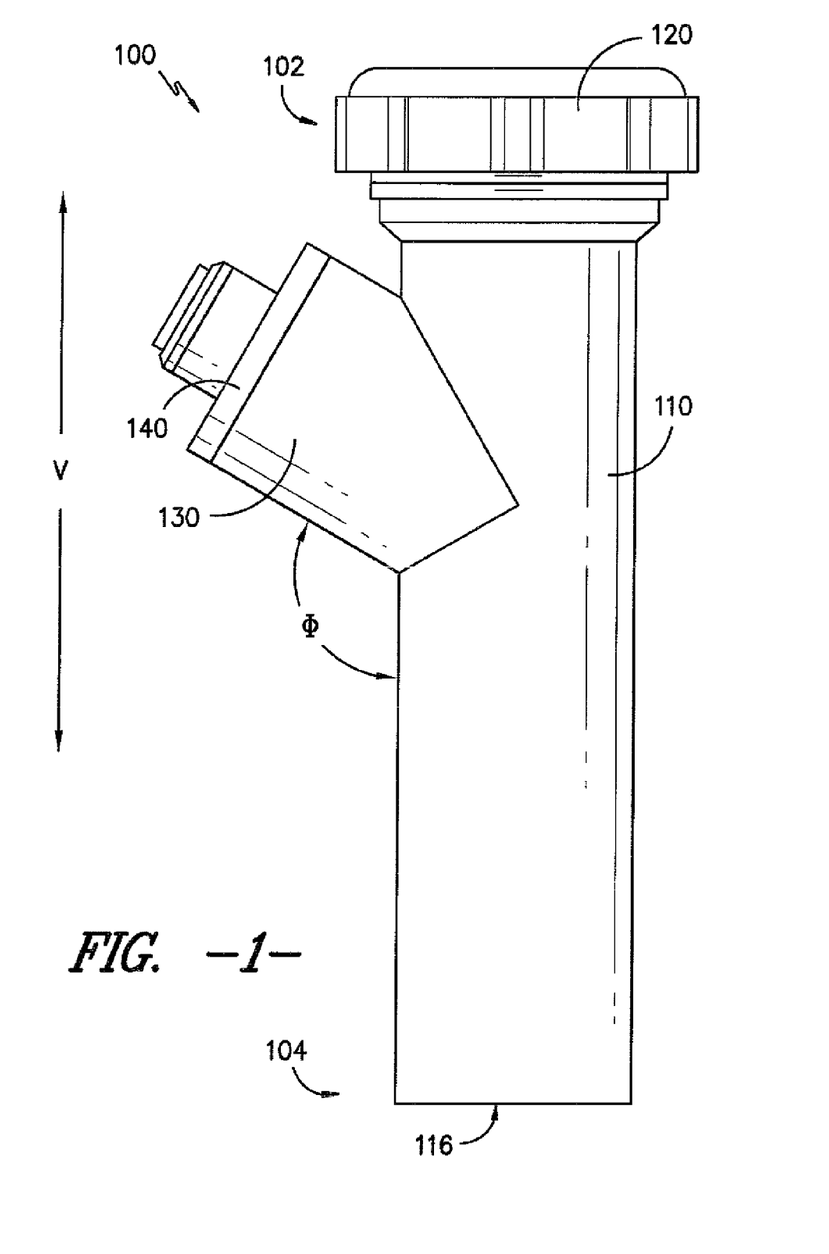
FIG. 1 provides an elevation view of a drain line adapter according to an exemplary embodiment of the present subject matter.

FIG. 1 provides an elevation view of a drain line adapter 100 according to an exemplary embodiment of the present subject matter. Drain line adapter 100 defines a vertical direction V and extends between a top portion 102 and a bottom portion 104, e.g., along the vertical direction V. Drain line adapter 100 can be mounted beneath a kitchen sink, e.g., to consolidate various waste streams and direct the waste streams to a drain (e.g., to a sewer or septic system). In particular, drain line adapter 100 is configured for receiving waste from a kitchen sink (not shown) and a water filtration system (not shown) such as a reverse osmosis water filtration system.

Drain line adapter 100 includes a primary conduit 110. Primary conduit 110 is substantially linear and extends longitudinally along the vertical direction V. A slip joint connector 120 is mounted to primary conduit 110 in order to permit mounting of primary conduit 110 to other plumbing such as a kitchen sink drain pipe (not shown). Drain line adapter 100 also includes a branch conduit 130 mounted to primary conduit 110. A push connector 140 is mounted to branch conduit 130 in order to receive a drain line (not shown) from a water filtration system (not shown).

Branch conduit 130 may be integrally or unitarily mounted or fixed to primary conduit 110. Thus, branch conduit 130 and primary conduit 110 may be constructed with a single, continuous piece material, e.g., a metal such as steel or a plastic such as polyvinyl chloride. As an example, branch conduit 130 and primary conduit 110 may be injection molded from a single piece of polyvinyl chloride.

Drain line adapter 100 includes features for hindering clogging of drain line adapter 100. In particular, drain line adapter 100 includes features for hindering solid waste passing through primary conduit 110 (e.g., from the kitchen sink) from settling within and clogging branch conduit 130. Such features are discussed in greater detail below.

Figure 2:
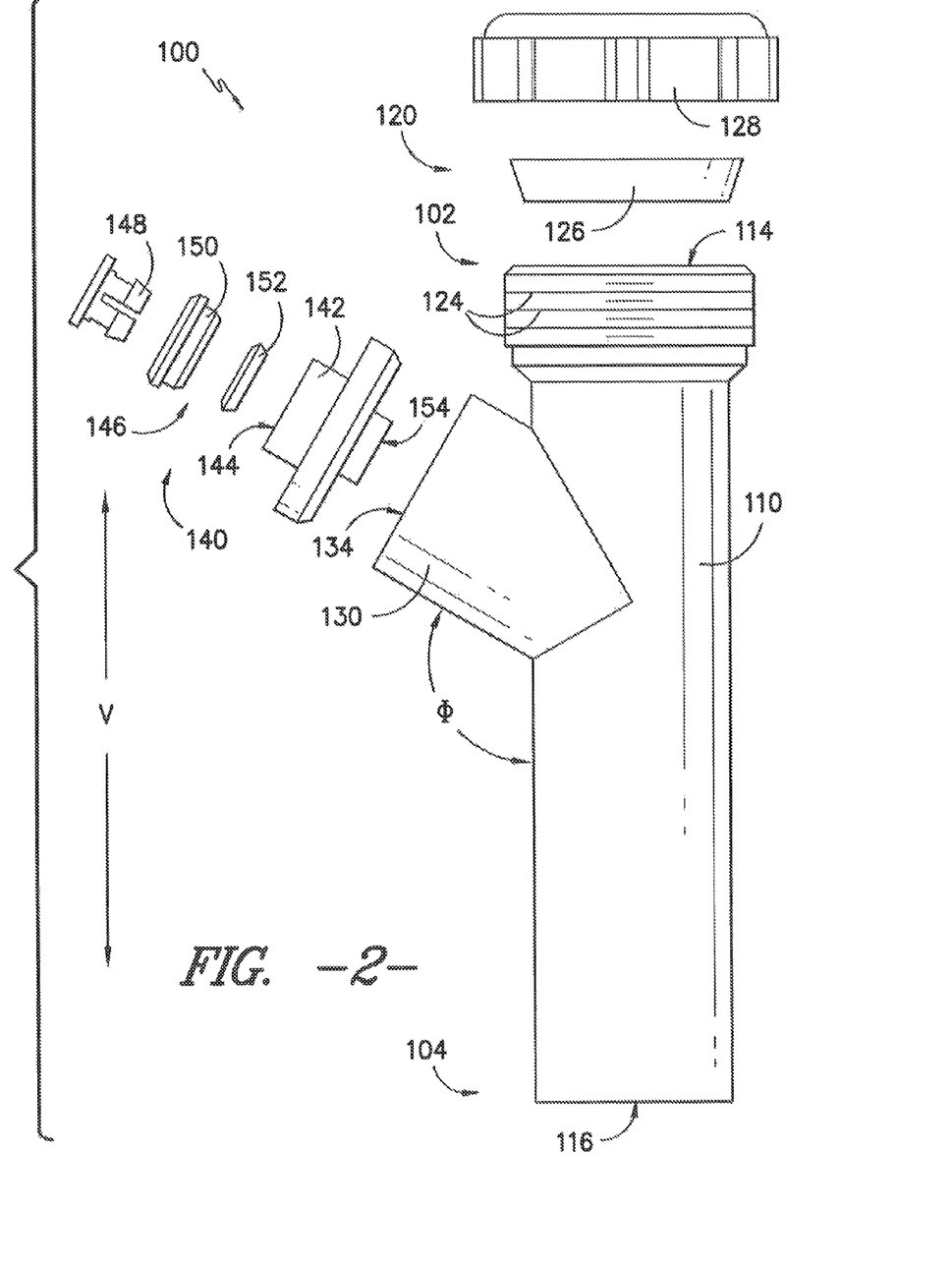
FIG. 2 illustrates an exploded view of the drain line adapter of FIG. 1.
Figure 3:
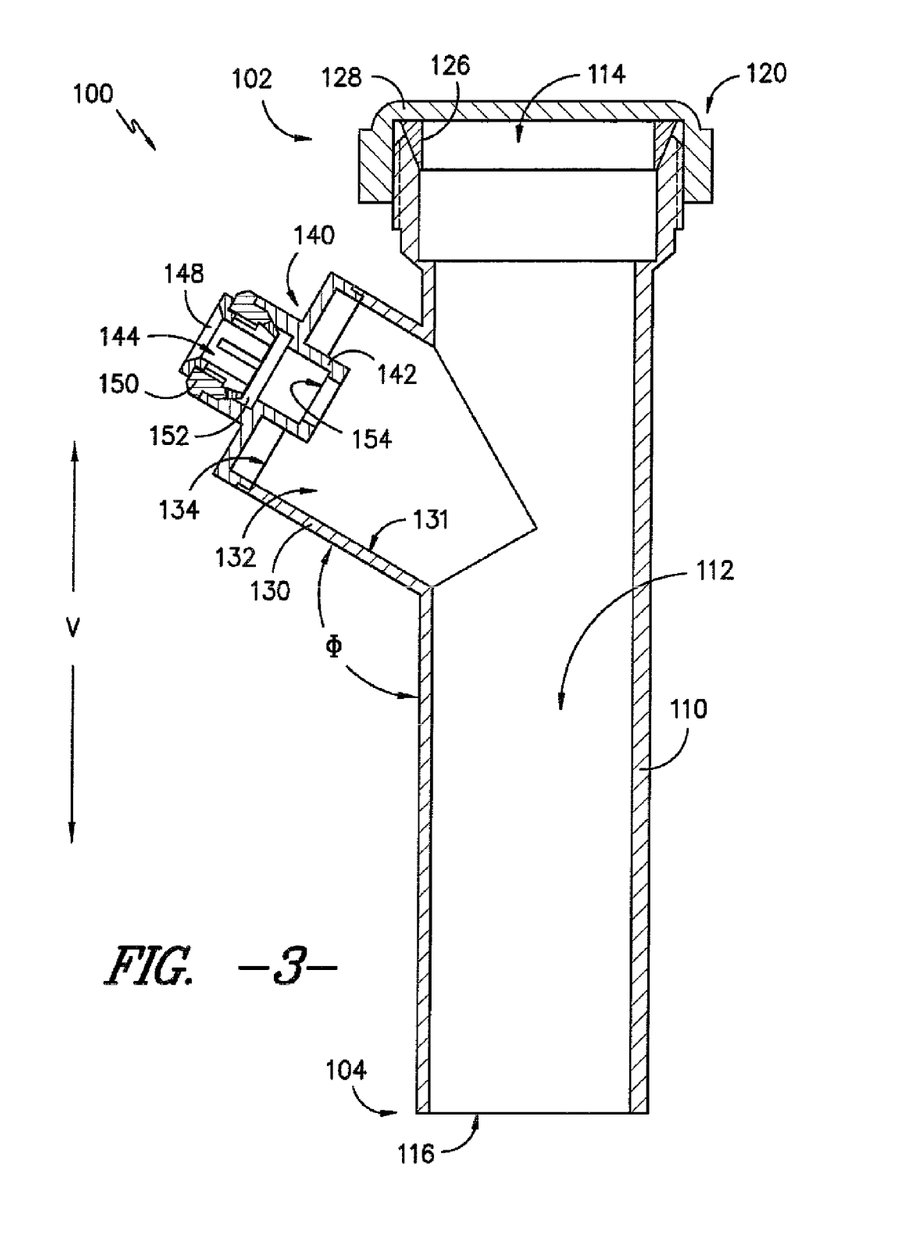
FIG. 3 is a section view of the drain line adapter of FIG. 1.

FIG. 2 illustrates an exploded view of drain line adapter 100. FIG. 3 is a section view of drain line adapter 100. Primary conduit 110 defines an inlet 114, e.g., at top portion 102 of drain line adapter 100 and an outlet 116, e.g., at bottom portion 104 of drain line adapter 100. Thus, inlet 114 is disposed above outlet 116 along the vertical direction V. In particular, inlet 114 is positioned directly above outlet 116 along the vertical direction V such that inlet 114 and outlet 116 are aligned along the vertical direction V. Thus, waste entering primary conduit 110 at inlet 114 can be urged by gravity towards outlet 116. Primary conduit 110 also defines a drain passage 112 (FIG. 3) that extends between inlet 114 and outlet 116 and permits waste to pass therethrough. As an example, inlet 114 can receive waste from a kitchen sink drain pipe (not shown), and such waste can be directed through primary conduit 110 via drain passage 112 to outlet 116.

Slip joint connector 120 is mounted to primary conduit 110 at inlet 114. Slip joint connector 120 includes threads 124, a gasket 126, and a cap 128. As may be seen in FIG. 2, threads 124 are fixed, e.g., integrally molded, to primary conduit 110 at inlet 114 of primary conduit 110. Turning to FIG. 3, gasket 126 is positioned adjacent inlet 114 of primary conduit 110. Further, cap 128 is mounted to primary conduit 110 with threads 124, e.g., cap 128 may be screwed onto threads 124. Cap 128 selectively secures gasket 126 to primary conduit 110.

As an example and as will be understood by those skilled in the art, cap 128 and gasket 126 can receive a pipe (not shown) to be mounted to drain line adapter 100 with cap 128 positioned above gasket 126, e.g., along the vertical direction V, on the pipe. The pipe can then be received within primary conduit 110 at inlet 114, and gasket 126 can be positioned at inlet 114 of primary conduit 110. Cap 128 can then be secured to primary conduit 110 with threads 124. By tightening cap 128, gasket 126 can be urged against inlet 114 of primary conduit 110 to provide a seal between primary conduit 110 and the pipe.

Branch conduit 130 defines an opening 134 and a branch passage 132 (FIG. 3). Branch passage 132 is in fluid communication with drain passage 112. Thus, waste can pass from branch passage 132 to drain passage 112 and outlet 116. Push connector 140 is mounted to branch conduit 130 at opening 134. As an example, opening 134 can receive waste from a water filtration system (not shown), and such waste can be directed through branch conduit 130 via branch passage 132 to primary conduit 110 and eventually outlet 116.

In the exemplary embodiment shown in FIG. 3, branch passage 132 of branch conduit 130 has about the same diameter as drain passage 112 of primary conduit 110. However, in alternative exemplary embodiments, branch passage 132 of branch conduit 130 may have a smaller or a larger diameter than drain passage 112 of primary conduit 110.

Push connector 140 includes a cover 142 that defines an aperture 144, a seating assembly 146, and a collet 148. Cover 142 is fixed, e.g., with adhesive, ultrasonic welding, or any other suitable method, to branch conduit 130 at opening 134 of branch conduit 130. By securing cover 142 to branch conduit 130, undesired or inconvenient disconnection of push connector 140 from branch conduit 130 can be hindered. Aperture 144 of cover 142 is smaller than opening 134 of branch conduit 130 such that aperture 144 has a diameter less than the diameter of opening 134 of branch conduit 130. Seating assembly 146 is received within aperture 144 of cover 142. Seating assembly 146 includes a collet seat 150 and an O-ring 152. Collet 148 is mounted to seating assembly 146, e.g., to collet seat 150.

As an example and as will be understood by those skilled in the art, collet 148 is configured for receipt of a drain hose (not shown). In particular, collet 148 can receive the drain hose, and the drain hose may be inserted into aperture 144 of cover 142 until the drain hose is positioned against an exit 154 of cover 140. Collet 148 may then be received by seating assembly 146 in order to secure the drain hose to branch conduit 130 and hinder the drain hose from pulling out of aperture 144. O-ring 152 can assist with sealing the connection.

As discussed above, drain line adapter 100 includes features for hindering clogging of drain line adapter 100. In particular, drain line adapter 100 includes feature for hindering solid waste from primary conduit 110 settling or accumulating within branch conduit 130 and potentially clogging the same. Turning back to FIG. 1, primary conduit 110 and branch conduit 130 define an angle φ therebetween. Angle φ may be any suitable angle greater than about ninety degrees. For example, angle φ may be between about one-hundred and seventy-five degrees and about one hundred and five degrees, between about one-hundred and fifty degrees and about one hundred and five degrees, between about one-hundred and thirty degrees and about one hundred and ten degrees, or about one hundred and twenty degrees.

By orienting primary conduit 110 and branch conduit 130 in such a manner, solid waste within primary conduit 110 can be hindered from settling within branch conduit 130. In particular, a bottom surface 131 (FIG. 3) of branch conduit 130 is downwardly sloped towards primary conduit 110 such that solid waste is hindered from settling on bottom surface 131. In particular, gravity can urge such solid waste to roll or slide off bottom surface 131 due to the orientation of primary conduit 110 and branch conduit 130.

Figure 4:
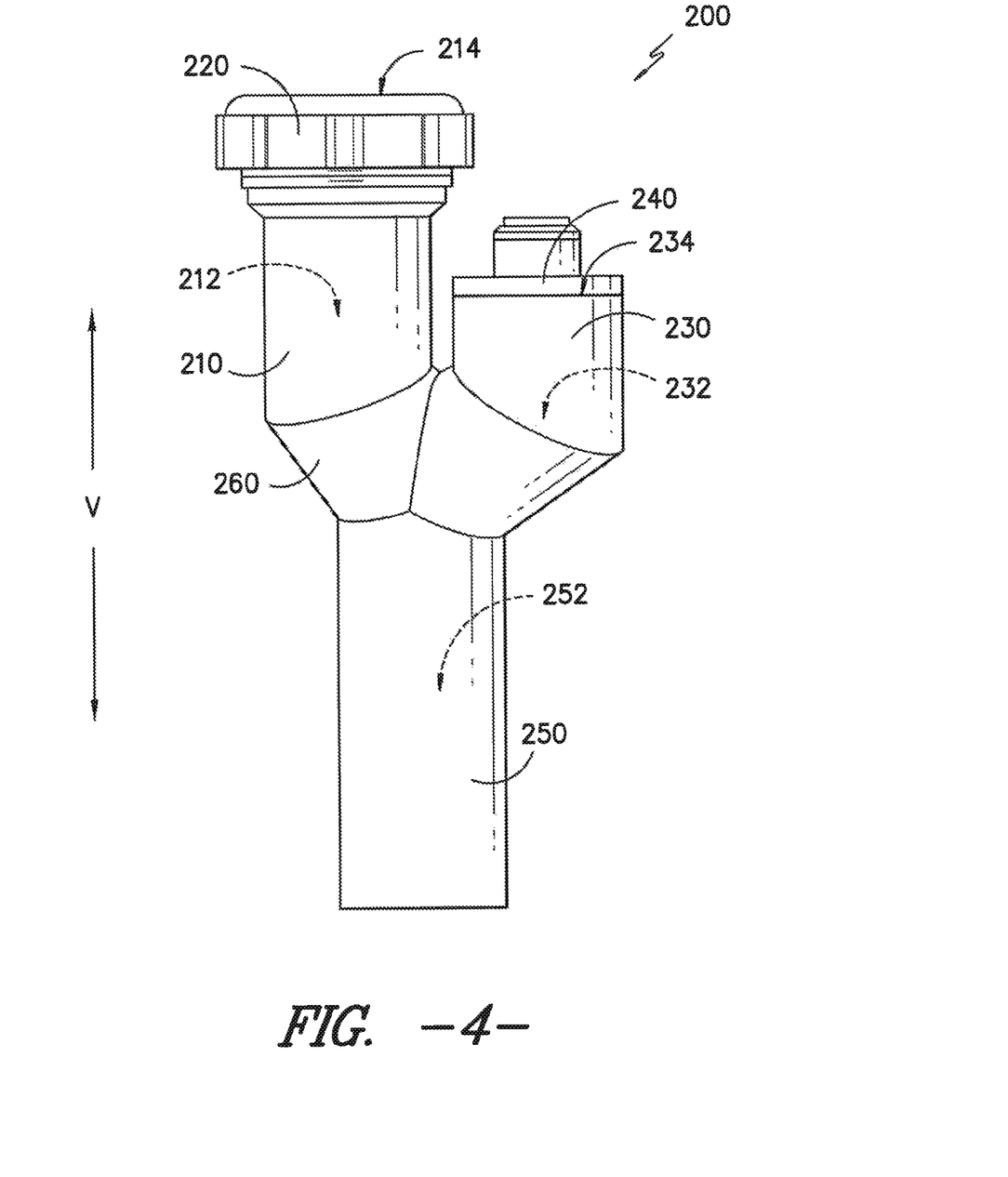
FIG. 4 provides an elevation view of a drain line adapter according to an additional exemplary embodiment of the present subject matter.

FIG. 4 provides an elevation view of a drain line adapter 200 according to an additional exemplary embodiment of the present subject matter. Drain line adapter 200 is similar to drain line adapter 100 (FIG. 1) and can be used in the same examples provided above for drain line adapter 100. Also, like drain line adapter 100, drain line adapter 200 includes features for hindering clogging of drain line adapter 200 as discussed in greater detail below.

Drain line adapter 200 includes a drain conduit 210 that defines a drain passage 212 and an inlet 214 that provides access to drain passage 212. A slip joint connector 220 (e.g., slip joint connector 120 (FIG. 1)) is mounted to drain conduit 210 at inlet 214. Drain line adapter 200 also includes a branch conduit 230 that defines a branch passage 232 and an opening 234 that provides access to branch passage 232. A push connector 240 (e.g., push connector 140 (FIG. 1)) is fixed to branch conduit 230 at opening 234. Drain line adapter 200 further includes an outlet conduit 250 that defines an outlet passage 252.

Drain conduit 210 and branch conduit 230 are disposed above outlet conduit 250, e.g., along the vertical direction V. In particular, drain conduit 210 and branch conduit 230 are offset or unaligned with outlet conduit 250 along the vertical direction V such that drain passage 212 and branch passage 232 are non-concentric with outlet passage 252 along the vertical direction V. Drain conduit 210, branch conduit 230, and outlet conduit 250 also have the same diameter. Thus, drain passage 212 of drain conduit 210, branch passage 232 of branch conduit 230, and outlet passage 252 of outlet conduit 250 can also have about the same diameter. However, in alternative exemplary embodiments, drain conduit 210, branch conduit 230, and outlet conduit 250 may each have any suitable diameter.

A manifold 260 connects drain conduit 210, branch conduit 230, and outlet conduit 250 such that drain passage 212 of drain conduit 210, branch passage 232 of branch conduit 230, and outlet passage 252 of outlet conduit 250 are in fluid communication. As an example, drain conduit 210 can receive a kitchen sink drain pipe (not shown) and direct waste from the kitchen sink drain pipe through drain passage 212 to outlet passage 252 of outlet conduit 250 via manifold 260. Similarly, branch conduit 230 can receive a water filtration system drain line (not shown) and direct waste from the water filtration system drain line through branch passage 232 to outlet passage 252 of outlet conduit 250 via manifold 260.

As may be seen in FIG. 4, drain conduit 210 (and drain passage 212) extends longitudinally along the vertical direction V. Also, branch conduit 230 (and branch passage 232) extends longitudinally along the vertical direction V. Thus, drain conduit 210 and branch conduit 230 are parallel to one another. Further, drain conduit 210 and branch conduit 230 are both positioned above outlet conduit 250, e.g., along the vertical direction V, to permit gravity to urge waste from drain passage 212 and branch passage 232 into outlet passage 252.

In addition, drain conduit 210 and branch conduit 230 are connected to manifold 260 at about the same height along the vertical direction V. Thus, waste from both drain and branch passages 212 and 232 enter manifold 260 at about the same point or location. In other words, waste flow through drain line adapter 200 is in parallel rather than in series. By orienting and positioning drain conduit 210 and branch conduit 230 in such a manner, solid waste within drain conduit 220 can be hindered from settling within branch conduit 230.

Drain conduit 210, branch conduit 230, and outlet conduit 250 may be integrally or unitarily mounted or fixed to manifold 260. Thus, drain conduit 210, branch conduit 230, outlet conduit 250, and manifold 260 may be constructed with a single, continuous piece material, e.g., a metal such as steel or a plastic such as polyvinyl chloride. As an example, drain line adapter 200 may be injection molded from a single piece of polyvinyl chloride.

Figure 5:
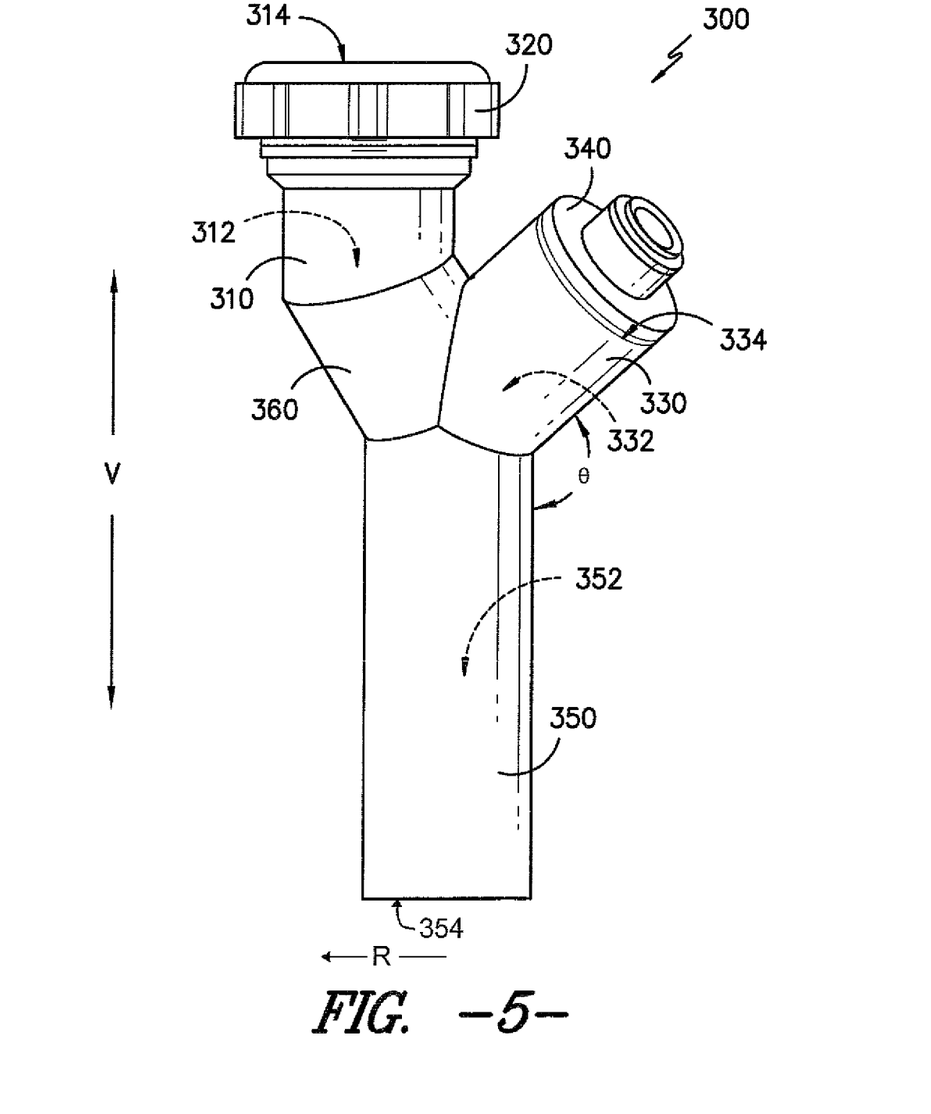
FIG. 5 provides an elevation view of a drain line adapter according to another exemplary embodiment of the present subject matter.

FIG. 5 provides an elevation view of a drain line adapter 300 according to another exemplary embodiment of the present subject matter. Drain line adapter 300 is similar to drain line adapter 100 (FIG. 1) and drain line adapter 200 (FIG. 4) and can be used in the same examples provided above for drain line adapters 100 and 200. Also, like drain line adapters 100 and 200, drain line adapter 300 includes features for hindering clogging of drain line adapter 300 as discussed in greater detail below.

Drain line adapter 300 includes a drain conduit 310 that defines a drain passage 312 and an inlet 314 that provides access to drain passage 312. A slip joint connector 320 (e.g., slip joint connector 120 (FIG. 1)) is mounted to drain conduit 310 at inlet 314. Drain line adapter 300 also includes a branch conduit 330 that defines a branch passage 332 and an opening 334 that provides access to branch passage 332. A push connector 340 (e.g., push connector 140 (FIG. 1)) is fixed to branch conduit 330 at opening 334. Drain line adapter 300 further includes an outlet conduit 350 that defines an outlet passage 352 and an exit 354.

Drain conduit 310 is disposed above outlet conduit 350, e.g., along the vertical direction V. In particular, drain conduit 310 is offset or unaligned with outlet conduit 350 along the vertical direction V such that drain passage 312 and outlet passage 352 are non-concentric along the vertical direction V. Drain conduit 310, branch conduit 330, and outlet conduit 350 also have about the same diameter, e.g., in a plane that is perpendicular to the vertical direction V. Thus, drain passage 312 of drain conduit 310, branch passage 332 of branch conduit 330, and outlet passage 352 of outlet conduit 350 can also have about the same diameter. However, in alternative exemplary embodiments, drain passage 312 of drain conduit 310, branch passage 332 of branch conduit 330, and outlet passage 352 of outlet conduit 350 may each have any suitable diameter.

A manifold 360 connects drain conduit 310 and outlet conduit 350 such that drain passage 312 of drain conduit 310 and outlet passage 352 of outlet conduit 350 are in fluid communication. As an example, drain conduit 310 can receive a kitchen sink drain pipe (not shown) and direct waste from the kitchen sink drain pipe through drain passage 312 to outlet passage 352 of outlet conduit 350 via manifold 360.

Branch conduit 330 is mounted or fixed to outlet conduit 350. In particular, outlet conduit 350 and branch conduit 330 define an angle θ therebetween. The angle θ may be any suitable angle greater than about ninety degrees. For example, angle θ may be between about one-hundred and seventy-five degrees and about one hundred and five degrees, between about one-hundred and fifty degrees and about one hundred and five degrees, between about one-hundred and thirty degrees and about one hundred and ten degrees, or about one hundred and twenty degrees.

By orienting drain conduit 310 and branch conduit 330 in such a manner, solid waste within drain conduit 310 can be hindered from settling within branch conduit 330. In particular, branch conduit 330 is downwardly sloped towards outlet conduit 350 such that solid waste from drain conduit 310 is hindered from settling in branch conduit 330. In particular, gravity can urge such solid waste to roll or slide out of branch passage 332 into outlet passage 352 due to the orientation of branch conduit 330.

In addition, drain conduit 310 and branch conduit 330 are both mounted to outlet conduit 350 at manifold 360 and at about the same height along the vertical direction V. Thus, waste from both drain and branch passages 312 and 332 enter manifold 360 and/or outlet conduit 350 at about the same point or location. In other words, waste flow through drain line connector 300 is in parallel rather than in series. By orienting and positioning drain conduit 310 and branch conduit 330 in such a manner, solid waste within drain conduit 320 can be hindered from settling within branch conduit 330.

Drain conduit 310, branch conduit 330, and outlet conduit 350 may be integrally or unitarily mounted or fixed to manifold 360. Thus, drain conduit 310, branch conduit 330, outlet conduit 350, and manifold 360 may be constructed with a single, continuous piece material, e.g., a metal such as steel or a plastic such as polyvinyl chloride. As an example, drain line adapter 300 may be injection molded from a single piece of polyvinyl chloride.

As may be seen in FIG. 5, inlet 314 of drain conduit 310, opening 334 of branch conduit 330, and exit 354 of outlet conduit 350 are not coplanar. In particular, centroids of inlet 314 of drain conduit 310, opening 334 of branch conduit 330, and exit 354 of outlet conduit 350 are not coplanar in any plane that is perpendicular to a radial direction R defined by drain line adapter 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drain line adapter, the drain line adapter defining a vertical direction, the drain line adapter comprising:
    a primary conduit that defines a drain passage, an inlet, and an outlet, the drain passage of said primary conduit extending longitudinally along the vertical direction such that the inlet of said primary conduit is disposed above the outlet of said primary conduit along the vertical direction;
    a slip joint connector mounted at the inlet of said primary conduit, said slip joint connector comprising
        threads fixed to said primary conduit at the inlet of said primary conduit;
        a gasket positioned adjacent the inlet of said primary conduit; and
        a cap mounted to said primary conduit with said threads, said cap selectively securing said gasket to said primary conduit;
    a branch conduit that defines a branch passage and an opening, said branch conduit mounted to said primary conduit, said primary conduit and said branch conduit defining an angle φ therebetween, the angle φ being greater than ninety degrees, the branch passage of said branch conduit being in fluid communication with the drain passage of said primary conduit; and
    a push connector mounted at the opening of said branch conduit, said push connector comprising
        a cover fixed to said branch conduit at the opening of said branch conduit, said cover defining an aperture, the aperture being in fluid communication with the branch passage of said branch conduit;
        a seating assembly received within the aperture of said cover; and
        a collet mounted to said seating assembly.

2. The drain line adapter of claim 1, wherein the inlet of said primary conduit is aligned with the outlet of said primary conduit along the vertical direction.

3. The drain line adapter of claim 1, wherein said primary conduit is substantially linear.

4. The drain line adapter of claim 1, wherein the drain passage of said primary conduit and the branch passage of said branch conduit have about the same diameter.

5. The drain line adapter of claim 1, wherein said primary conduit and said branch conduit are unitarily connected.

6. The drain line adapter of claim 1, wherein the aperture has a diameter less than the diameter of the branch passage of said branch conduit.

7. A drain line adapter, the drain line adapter defining a vertical direction, the drain line adapter comprising:
    a drain conduit that defines a drain passage and an inlet, the drain passage of said drain conduit extending longitudinally along the vertical direction;
    a slip joint connector mounted at the inlet of said drain conduit, said slip joint connector comprising
        threads fixed to said primary conduit at the inlet of said drain conduit;
        a gasket positioned adjacent the inlet of said drain conduit; and
        a can mounted to said drain conduit with said threads, said cap selectively securing said gasket to said drain conduit;
    a branch conduit that defines a branch passage and an opening, the branch passage of said branch conduit extending longitudinally along the vertical direction, said branch conduit positioned parallel to said drain conduit;
    a push connector mounted at the opening of said branch conduit, said push connector comprising
        a cover fixed to said branch conduit at the opening of said branch conduit, said cover defining an aperture, the aperture being in fluid communication with the branch passage of said branch conduit;
        a seating assembly received within the aperture of said cover, and
        a collet mounted to said seating assembly;
    an outlet conduit that defines an outlet passage, the outlet passage of said outlet conduit extending longitudinally along the vertical direction; and
    a manifold connecting said drain conduit, said branch conduit, and said outlet conduit such that the drain passage of said drain conduit, the branch passage of said branch conduit, and the outlet passage of said outlet conduit are in fluid communication.

8. The drain line adapter of claim 7, wherein the drain passage of said drain conduit and the branch passage of said branch conduit are unaligned with the outlet passage of said outlet conduit along the vertical direction.

9. The drain line adapter of claim 7, wherein the drain passage of said drain conduit, the branch passage of said branch conduit, and the outlet passage of said outlet conduit have about the same diameter.

10. The drain line adapter of claim 7, wherein said drain conduit, said branch conduit, said outlet conduit, and said manifold are unitarily connected.

11. The drain line adapter of claim 7, wherein the aperture has a diameter less than the diameter of the branch passage of said branch conduit.

12. A drain line adapter, the drain line adapter defining a vertical direction, the drain line adapter comprising:
a drain conduit that defines a drain passage and an inlet, the drain passage of said drain conduit extending longitudinally along the vertical direction;
a slip joint connector mounted at the inlet of said drain conduit, said slip joint connector comprising
threads fixed to said drain conduit at the inlet of said drain conduit;
a gasket positioned adjacent the inlet of said drain conduit; and
a cap mounted to said drain conduit with said threads, said cap selectively securing said gasket to said drain conduit;
an outlet conduit that defines an outlet passage, the outlet passage of said outlet conduit extending longitudinally along the vertical direction;
a branch conduit that defines a branch passage and an opening, said branch conduit mounted to said outlet conduit, said outlet conduit and said branch conduit defining an angle $\theta$ therebetween, the angle $\theta$ being greater than ninety degrees;
a push connector mounted at the opening of said branch conduit, said push connector comprising
a cover fixed to said branch conduit at the opening of said branch conduit, said cover defining an aperture, the aperture being in fluid communication with the branch passage of said branch conduit;
a seating assembly received within the aperture of said cover; and
a collet mounted to said seating assembly; and
a manifold connecting said drain conduit, said branch conduit, and said outlet conduit such that the drain passage of said drain conduit, the branch passage of said branch conduit, and the outlet passage of said outlet conduit are in fluid communication.

13. The drain line adapter of claim 12, wherein the drain passage of said drain conduit is unaligned with the outlet passage of said outlet conduit along the vertical direction.

14. The drain line adapter of claim 12, wherein the drain passage of said drain conduit, the branch passage of said branch conduit, and the outlet passage of said outlet conduit have about the same diameter.

15. The drain line adapter of claim 12, wherein said drain conduit, said branch conduit, said outlet conduit, and said manifold are unitarily connected.

16. The drain line adapter of claim 12, wherein the aperture has a diameter less than the diameter of the branch passage of said branch conduit.

* * * * *